No. 664,272. Patented Dec. 18, 1900.
G. W. JOHNSON.
MEASURING AND REGISTERING APPARATUS.
(Application filed Feb. 11, 1899.)
(No Model.) 4 Sheets—Sheet 2.
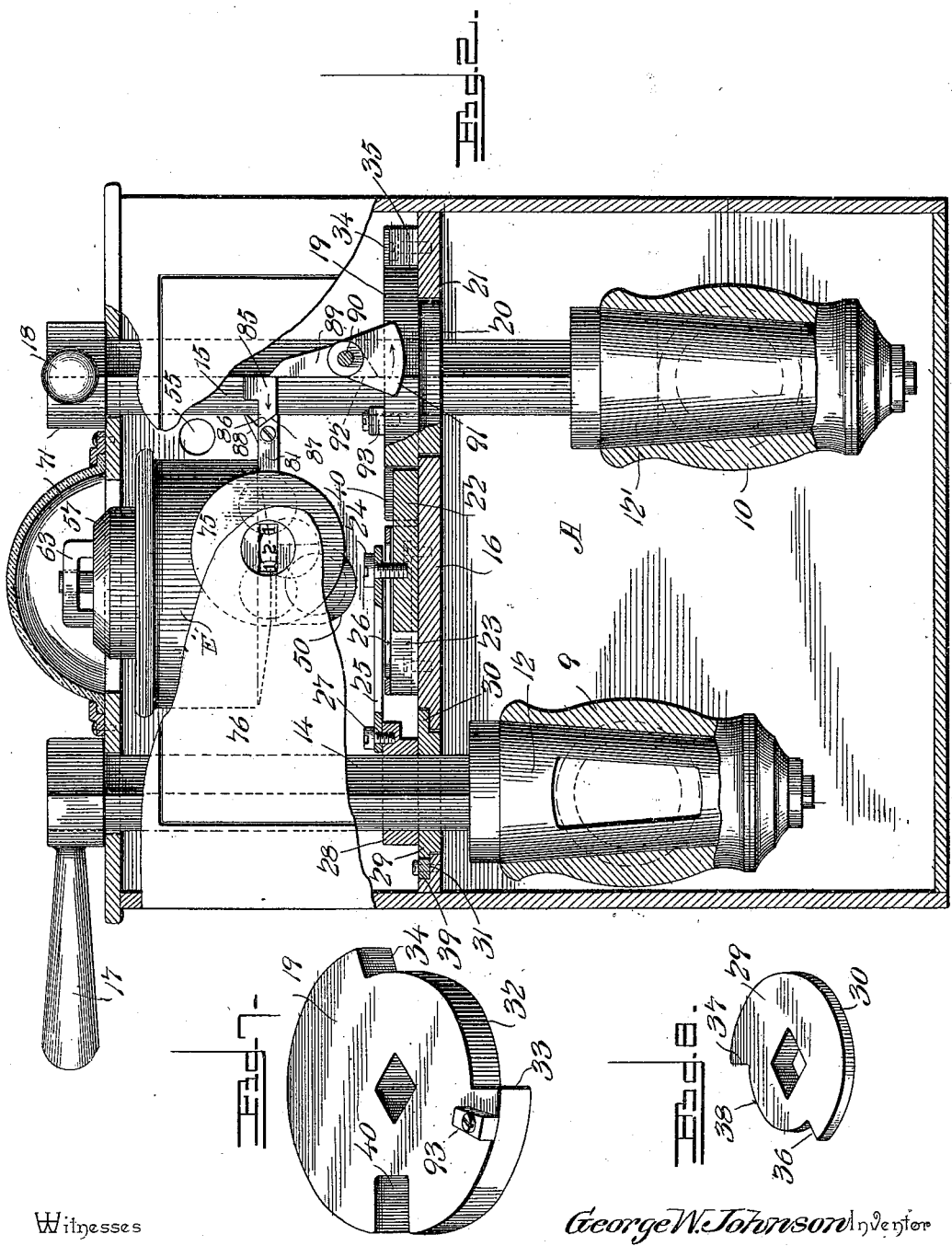
Witnesses
E. F. Stewart
Heith Sutherland
George W. Johnson, Inventor
By C.A. Snow & Co. Attorneys.

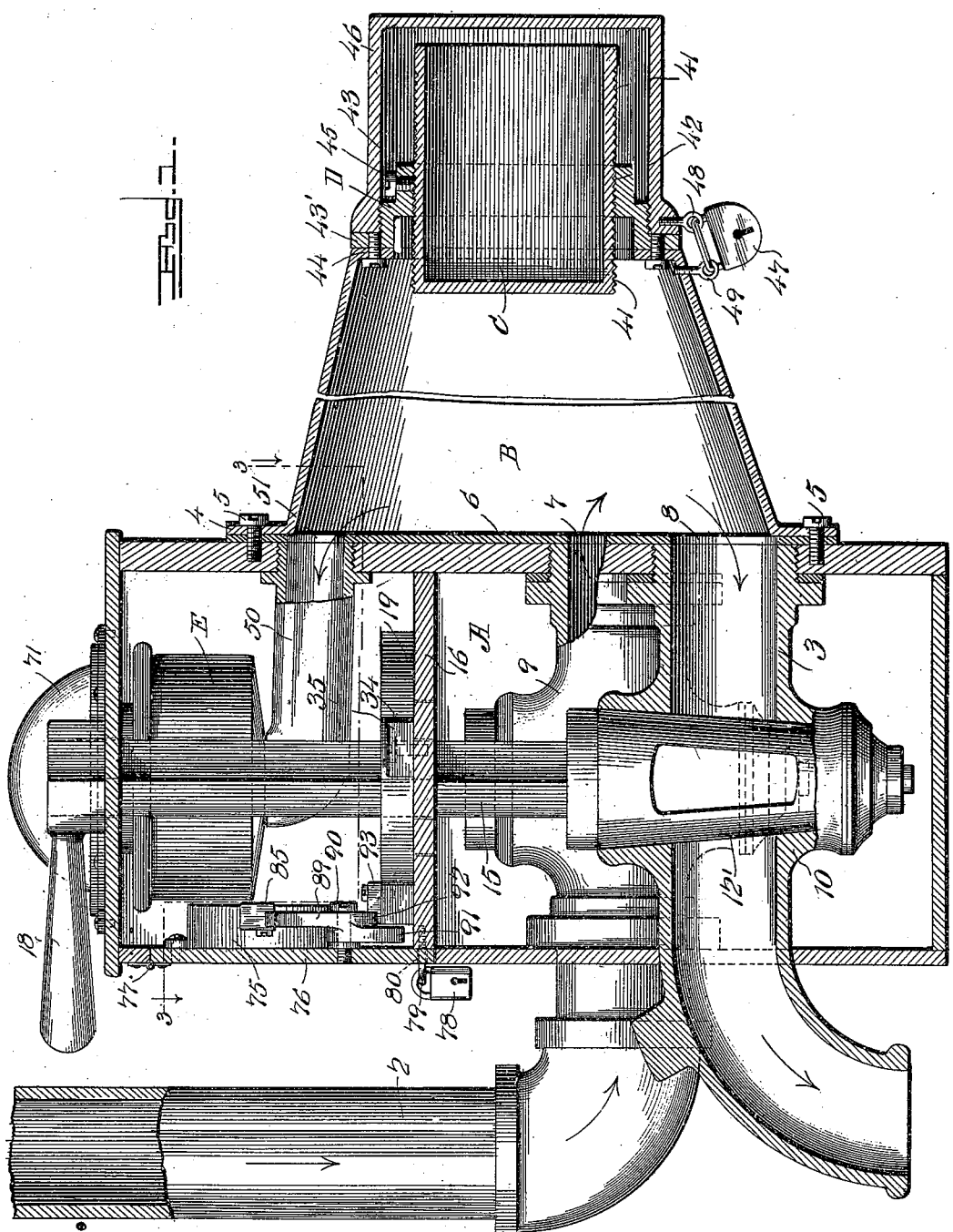

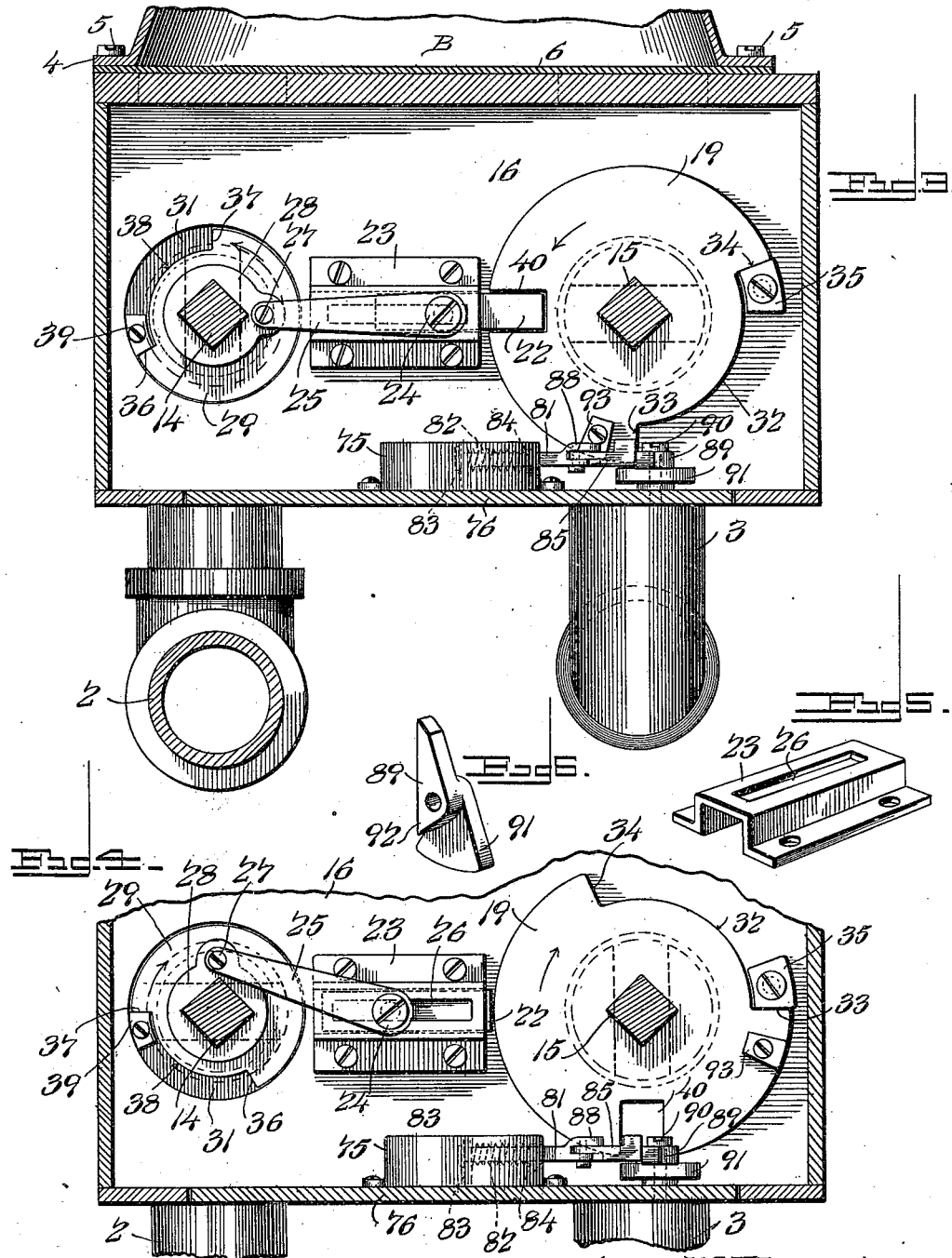

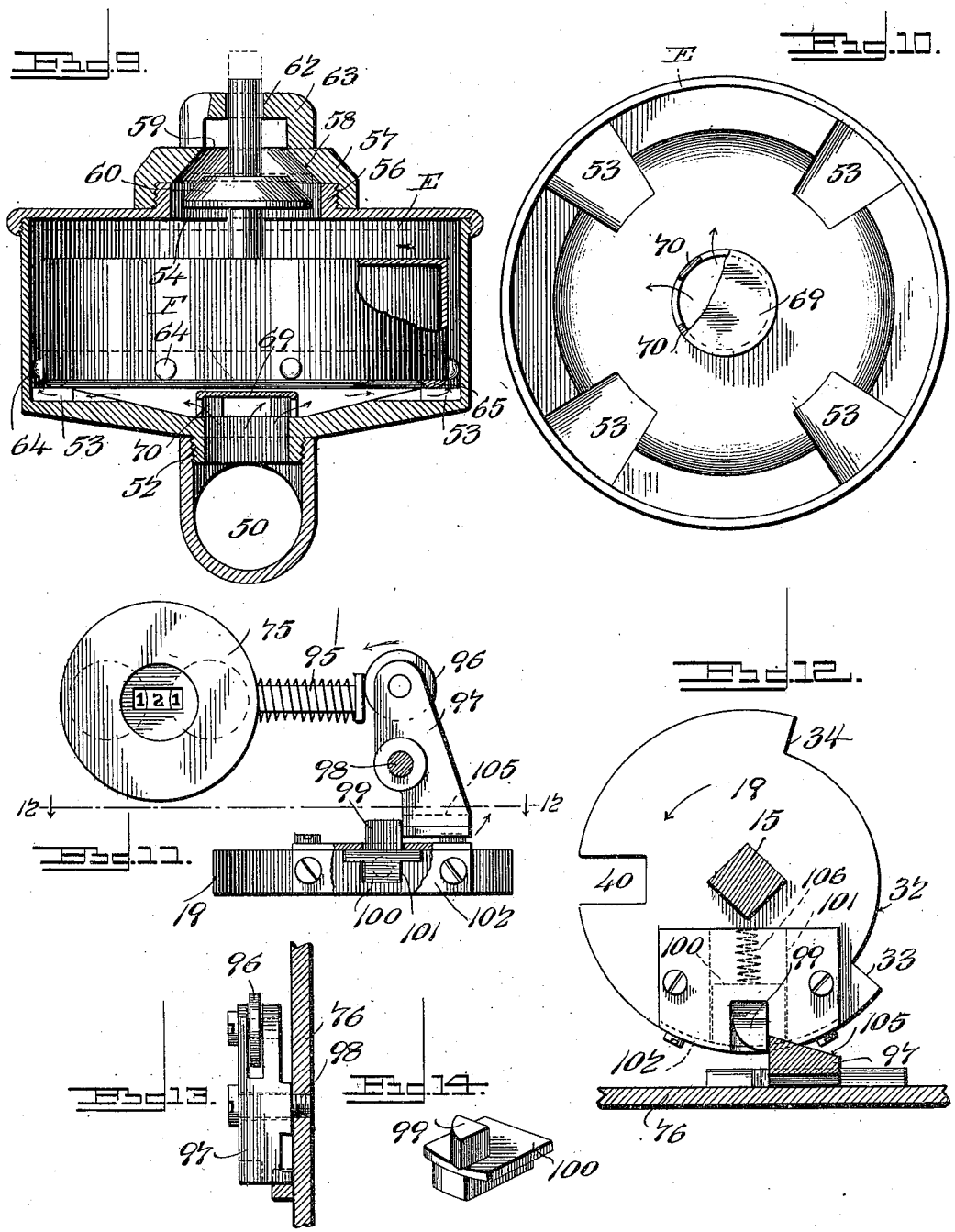

UNITED STATES PATENT OFFICE.

GEORGE WILFRID JOHNSON, OF MEXICO, MEXICO.

MEASURING AND REGISTERING APPARATUS.

SPECIFICATION forming part of Letters Patent No. 664,272, dated December 18, 1900.

Application filed February 11, 1899. Serial No. 705,297. (No model.)

*To all whom it may concern:*

Be it known that I, GEORGE WILFRID JOHNSON, a citizen of the United States, residing at the city of Mexico, in the Republic of Mexico, have invented a new and useful Registering and Measuring Apparatus, of which the following is a specification.

This invention relates to a registering and measuring apparatus; and it involves supply and discharge controlling means and a measuring reservoir or chamber communicating with supply and discharge pipes or conduits constituting part of said means, and the coöperating elements are so disposed relatively to each other as to accurately measure predetermined quantities of liquid and to vary or regulate with precision the amount measured, to prevent the simultaneous action of the supply and discharge valves, which is accomplished by interlocking or regulating mechanism of a peculiar nature, to register properly the charges of liquid as they are drawn off, to provide for the emission of air from the reservoir while the latter is filling and when said reservoir is filled to instantly and automatically arrest the further supply of liquid, and to provide for the admission of atmospheric air when it is desired to empty the reservoir, thereby to insure the proper action of the apparatus, and the several parts of the latter are preferably housed and locked within a casing, tank, or other suitable inclosing device, so as to be inaccessible to unauthorized persons who might be inclined to tamper with the registering-valve or other mechanisms.

The invention includes as one of its essential features a measuring-reservoir in combination with a device movable relatively thereto to vary the containing capacity of the reservoir and supply and discharge controlling mechanisms operative in connection with said measuring-reservoir, and by reason of this organization any variations in a standard measure due to different conditions can be easily regulated by the manipulation of the device which works in conjunction with the reservoir, said device being preferably movable relatively to the reservoir, whereby when it is moved in one direction the cubical capacity of the reservoir or measuring-chamber will be increased and whereby when moved in the opposite direction such capacity will be decreased.

The apparatus also includes, in connection with the supply and discharge valves, which serve, respectively, on their proper operation to permit the entrance or emission of a liquid to and from the measuring-chamber, interlocking mechanism which prevents both valves being open at the same time and which is objectionable, as in such event the liquid would be permitted to flow through the apparatus without being measured or registered. In connection with each valve I provide a locking device or stop, and these stops are operated by the valves, and each of them serves to block or control the operation of the other. When one valve is open, the stop operative therewith will be so positioned as to stand in the path of the other valve-stop, whereby the valve to which the latter is connected cannot be actuated, and this operation is repeated with respect to the other valve-stop, it being obvious that the action of the two is reciprocal. Suitable means are provided for limiting the motion of the two valves whereby neither of them can be turned beyond a certain position, and the disposition of the members is such that both valves can be closed at the same time, as no harm can result from this. In conjunction with one of the valves I provide a register, which may be of any type suitable for the purpose, and this register is preferably operated in connection with the discharge-valve, and the organization is such that the register is operated each time the discharge-valve is opened to empty the measuring reservoir or chamber. The register is preferably inclosed in the casing, said casing having a suitable opening through which the disks or indicating-dials can be seen.

The apparatus includes, as another feature and in combination with a tank having an air-vent and with a reservoir communicating with said tank, a valve and means for expelling the air from said tank and for operating the valve to close said vent when the air is removed, in virtue of which the further supply of liquid to the reservoir can be stopped when the said valve is closed. The means for operating said vent consists of a float adapted to rise in said tank with the liquid, whereby the valve can be instantly closed at the proper point, and the valve is connected, preferably, with the tank by a stem, which extends through a wall of the casing, and said extended end of the valve-stem is preferably inclosed by a cap of transparent material, through which the position of the valve-stem can be observed, so that an attendant can instantly determine whether the measuring-chamber is full.

The apparatus is peculiarly adapted for use in bottling establishments and such places where accurate measurement and registration thereof are of prime importance.

With these ends in view the invention consists in the novel combination of elements and in the construction and arrangement of parts, which will be hereinafter fully described and claimed.

To enable others to understand the invention, I have illustrated the preferred embodiment thereof in the accompanying drawings, forming a part of this specification, and in which—

Figure 1 is a sectional side elevation, with portions broken away, of a measuring and registering apparatus constructed in accordance with my invention and the supply-valve being open and the discharge-valve being closed to permit the supply of liquid to the measuring-reservoir. Fig. 2 is a sectional front elevation with parts broken away and the valves being in the positions in which they occupy in said Fig. 1. Fig. 3 is a sectional plan view, the section being taken at a point slightly above the valve-interlocking mechanism and the valves being in position corresponding with Figs. 1 and 2, and the said interlocking mechanism serving to lock the discharge-valve closed, section being on line 3 3, Fig. 1. Fig. 4 is a substantially similar view, the positions of the valves being exactly reversed and the supply-valve being locked against opening movement. Fig. 5 is an enlarged detail of a guide for a block constituting part of the valve-interlocking mechanism. Fig. 6 is an enlarged perspective of one of the parts of the register-operating mechanism. Fig. 7 is an enlarged perspective detail of a stop connected with the discharge-valve and of a primary actuator for the register mechanism. Fig. 8 is a similar view of a disk connected with the supply-valve and serving in connection with a stop to restrain the motion of said valve. Fig. 9 is a cross-sectional view of the tank and float and the valve connected with said tank, showing by arrows the direction taken by the air in escaping through the vent. Fig. 10 is a horizontal sectional plan through the tank, taken at a point slightly below the float. Figs. 11 to 14, inclusive, are details hereinafter more particularly described and illustrating a modified form of mechanism for actuating the register, Fig. 12 being a section on the line 12 12, Fig. 11.

Like characters denote like and corresponding parts in each of the several figures of the drawings.

The casing or housing for inclosing the different parts of the apparatus may be of any suitable construction, it being represented in the drawings as consisting of a substantially rectangular box A, through which the supply and discharge pipes 2 and 3 extend, said pipes being threaded at their inner ends to engage threaded openings in the rear wall of the casing, as clearly shown in Fig. 1, and these pipes communicate with the measuring reservoir or chamber B, which is substantially of frusto-conical shape, the reduced end being farther from the casing, so that the fluid can quickly gravitate down the inside thereof and into the discharge-pipe 3. The measuring-reservoir B is provided along its inner edge with the annular vertical flange 4, through which screws or other fastening devices, as 5, pass, thereby to hold the measuring-reservoir firmly against the rear wall of the casing, and between said reservoir and casing the packing 6 is disposed, said packing consisting, preferably, of a disk of suitable material held in proper position by the screws 5 and serving to tightly close the joint between the measuring-chamber and the casing. Said disk has openings, as 7 and 8, communicating with the openings in the ends of the supply and discharge pipes 2 and 3, respectively. The supply-pipe communicates with a suitable vat, tank, or other main supply apparatus, (not shown,) and on opening a valve therein the liquid can flow from the supply-pipe into the measuring chamber or reservoir B, and during this time the discharge-valve in the pipe 3 is closed. When the quantity is properly measured, the supply-valve will be closed and the discharge-valve opened to discharge the contents of the apparatus. The supply-pipe 2 is shown as being at a slightly-higher elevation than the discharge-pipe 3, and each is provided at a point substantially midway of its length in the casing A with a valve-chamber, (designated, respectively, by 9 and 10,) and which valve-chambers receive the valves 12 and 12', respectively, said valves being of the turning-plug type and being vertically mounted and their valve-stems 14 and 15 being preferably square and extending upward through the dividing-wall 16 in the casing A, which separates said casing into two compartments, and through openings in the top of said casing, said valves being preferably hand-operated and the stems thereof being embraced by the handles 17 and 18, constituting a convenient means for turning the valves in opposite directions to permit the flow or cause the stoppage of the liquid.

In connection with the manually-operated supply and discharge valves, which latter may be of any suitable construction capable of carrying out the object of the invention, I provide interlocking mechanism so constructed as to absolutely prevent the simultaneous opening of the two valves, as it is evident that in case they are both open at the same time the liquid from the main supply device could flow through the apparatus without being measured. The valve-stem 15 is provided at a suitable point in its height with the disk or stop 19, snugly fitting around said stem and having the depending guide-flange 20 fitting within the opening 21 in the wall 16, and the sliding bolt 22 coöperates with the disk or stop 19 and constitutes a coöperating stop, said sliding bolt being movable in a path transversely of the periphery of the disk or stop 19 and being guided in such path by the bracket 23, secured in some suitable manner to the upper face of the wall 16 and being pivoted, as at 24, to the link 25, said pivot passing through the longitudinal slot 26 in the upper side of the guide-bracket. The link is pivoted at its opposite end, as at 27, to the disk 28 on the squared valve-stem 14, it being evident that by reason of the squaring of the stem and the corresponding openings in the disks 19 and 28 said disks are held against turning movement relatively to said stems. The stem 14 is provided with a second disk 29, having along its outer edge the flange 30, resting and turning upon the flange 31 around the opening through the wall 16, through which the valve-stem 14 passes, and the upper face of said last-mentioned disk is flush with the upper face of the dividing-wall. The periphery of the disk 19 is cut out, as at 32, this construction producing the shoulders 33 and 34, adapted, respectively, to abut against the stop 35, suitably secured to the upper side of the dividing-wall 16, and this construction constitutes a simple means for limiting the operation of the discharge-valve 12'. In Fig. 4 the discharge-valve is supposed to be open, so as to permit the contents of the apparatus to pass therefrom, and it will be seen on inspection of said figure that the shoulder 33 is in contact with the stop 35, and the act of closing the discharge-valve will move the disk 19 in the direction of the arrow, such motion being permitted until the shoulder 34 strikes the stop 35, thereby preventing the further movement of the valve and positively indicating that it has reached its closed position. On the opening of the valve this action will be reversed. The disk 29 is provided with similar shoulders 36 and 37, formed by cutting out the periphery of said disk, as at 38, and which shoulders coöperate with the stop 39, disposed in the path thereof, for the purpose of limiting the operation of the supply-valve.

The periphery of the disk 19 has at a proper point the stop-receiving notch or recess 40, into which the free end of the sliding or reciprocatory bolt 22 is thrust, as indicated clearly in Fig. 3, when the supply-valve is opened, so that the movement of the stop or disk 19, and consequently of the discharge-valve, (then closed,) cannot take place. When, however, the discharge-valve is opened, the disk 29 will follow the direction of the arrow indicated in Fig. 3 or until the shoulder 37 abuts against the stop 39, and just before this point is reached the free end of the bolt 22 will pass across the periphery of the disk 19, as indicated in Fig. 4, so that the discharge-valve will be released and can be opened, and as said discharge-valve is opened the disk 19 will follow the path indicated by the arrow in Fig. 3 until the shoulder 33 strikes the stop 35. On the initial movement of the disk 19 the solid portion of the periphery thereof will be brought opposite the end of the sliding stop 22, as shown in Fig. 4, thereby to positively block the advance of said stop 22, and consequently prevent the opening of the supply-valve. When the contents of the reservoir have been drawn off, the discharge-valve will be closed, and this operation will move the disk 19 in the direction of the arrow indicated in Fig. 4 until the shoulder 34 strikes the stop 35, at which time the let-off notch 40 will be opposite the end of the reciprocatory bolt 22, thereby releasing said bolt, and consequently the valve 12', and as said valve is opened in the direction of the arrow shown in Fig. 4 the end of the bolt will be thrust into the notch 40, thereby to again lock the discharge-valve, and these operations with respect to the sliding and the oscillatory stop will follow while the apparatus is in use. On inspection of Fig. 3 it will be observed that the supply-valve can be shut, which operation carries the bolt or stop 22 out of the notch 40, so that the valves can be simultaneously closed; but it will be understood that both of them cannot be opened at the same time.

In connection with the measuring-reservoir B, I provide a device for varying the containing capacity thereof for the purpose of measuring different quantities, and said regulating device may be of any suitable construction. It is represented as a cylinder C, extending into said reservoir and being adapted when moved in opposite directions to vary the cubical capacity thereof. The said regulating device or cylinder C is exteriorly threaded, as at 41, and engages the internal threads 42 on the inner section 43 of the carrying-ring D, said ring having at its inside the annular flange 43', which fits flatwise against the inwardly-turned flange 44 on the outer end of the reservoir B, as indicated clearly in Fig. 1. The inner end of the regulating device C is closed, and it will be evident that by turning the same to the right it will be fed forward by the action of the screw-threads to decrease the cubical capacity or area of said reservoir and when turned to the left will be moved rearward to increase such area, and for the purpose of holding said regulating device in an adjusted position I provide a positive device, as the set-screw 45, although in some instances the engaging threads 41 and 42 could be utilized for this purpose. The set-screw 45 is carried by the ring D and is adapted to firmly engage the periphery of the regulating device C, thereby to maintain the latter in a fixed position. The cylinder C, which for the purpose of securing lightness is made hollow and has its outer end open, is protected against unlawful tampering by the cap 46 in threaded engagement with the outer surface of the ring D and which is adapted to abut against the flange 43' when in its normal position and which serves to cover the regulating-cylinder C, said cap being held in its normal position by a lock, as 47, the keeper of which passes through the eyes 48 and 49, secured, respectively, to said cap and reservoir, on the outside thereof. By removing the lock 47 the cap 46 can be removed to reach the regulating-cylinder C for the purpose of adjusting the latter to correct any error caused by misadjustment of the parts or to measure a quantity of fluid different from that discharged at a prior operation of the parts.

Means are employed for insuring the exhaust of all the air within the reservoir when the proper charge is in the apparatus, thereby preventing automatically the further entrance of liquid thereinto. A controlling-tank is shown at E, this being disposed within the upper chamber of the casing and connected with the reservoir B by the vent-pipe 50, the opening in which registers with the opening 51 in the packing-disk 6, and it will be evident on an inspection of Fig. 1 that the upper side of the reservoir is located at a point below the upper side of the pipe 50, thereby preventing the trapping of any air in said reservoir as the liquid fills the connecting-pipe 50. The bottom of the tank E is furnished with a screw-threaded nipple 52, fitted in the upper end of the pipe 50 and is also inclined, as indicated clearly in Fig. 9. The bottom of the tank has a series of four or more ports or exhaust-openings 53, located near the junction of the same with the side wall thereof and through which the air can escape, following the direction of the arrows in said figure and also as represented in Fig. 10, the air passing around the float F, which is represented as consisting of a hollow cylinder freely fitted within the similarly-shaped tank E, the air as it rises passing between the tank and float and out through the vent-opening 54 and from thence through the openings 55 in the casing. The tank is provided substantially centrally thereof with the annular externally-threaded flange 56, adapted to receive the internally-threaded cap 57, which has interiorly thereof the tapered valve-seat 58, leading to the opening 59 in cap, and said opening being covered by the tapered valve 60, which is adapted to fit firmly against the seat 58 when all the air has been exhausted, thereby preventing the further supply of liquid when the requisite quantity is within the reservoir. The valve is connected with the float F by the longitudinal valve-stem extending upward from the float and through the valve and also through the opening 62 in the yoke 63, which is disposed over the opening 59 in the threaded cap 57, the yoke serving as a suitable means for guiding the tank in its vertical movement, and to aid in this last-mentioned operation the float is provided on its outer face and near the bottom thereof with a series of rounded projections 64, contiguous to the inside of the tank and serving by engaging the latter to limit the sidewise motion of said tank. The float is provided on its under side thereof with the annular projection or bead 65, located near the periphery of the float and adapted to engage the upper side of the tank-bottom, thereby to aid in centralizing or properly seating the same when it is in its lowermost position.

At a point in vertical line with the connecting-pipe 50 the guard 69 is disposed, said guard consisting of a circular plate connected with the bottom of the tank by the offsets 70. This guard is disposed in the path of the liquid as it rises toward the tank E and is adapted to receive the force thereof and of the exhausting air, so that the two combined forces cannot be directly applied to the float prematurely, and it will be evident that the spaces between the offsets 70 serve as ports or passages through which the rising liquid and air can pass to elevate the float. As the fluid rises in the tank it serves to elevate the float, and the air is forced out through the vent-opening 54, and when the air is entirely exhausted the valve will be forced tightly against its seat by said float to prevent the escape of liquid. The upper end of the valve-stem and the adjacent parts, as shown clearly in Fig. 2, extend through the top of the casing, and the valve-stem is surrounded by the semispherical glass cap or cover 71, through which the position of the stem can be seen for the purpose of determining whether or not the valve is against its seat. When the valve is closed, the supply-valve 12 is shut and the discharge-valve opened, at which time the atmospheric air pressing against the upper side of the air-valve 60 can force the same downward and destroy the vacuum in the apparatus, and thereby permit the measured contents to be discharged.

The registering device is designated by 75, and it is shown as secured to the inside of the door 76 and as being of ordinary construction, and said door is hinged, as at 77, to the casing and is held in its closed position by the lock 78, the shackle of which passes through the hasp or staple 79, carried by the casing and extending through the opening 80 in the lower side of the door. The register mechanism is operated by the reciprocatory bar 81, connected thereto in some well-known manner and held in its outer position (shown in Fig. 2) by the coiled spring 82, bearing against the shoulders 83 and 84. The bar 81 is in two parts, the outer one being designated by 85 and consisting of a gravity extension held in its normal position by its own weight and having a beveled face 86, adapted to engage the correspondingly-beveled face 87, as shown in Fig. 2, and to be limited in its upward movement by the stop 88 on the main portion of said bar. The outer or free end of the bar 81 is normally engaged by the point or free end of the counterbalanced lever 89, pivoted, as at 90, to the inside of the casing, and the weight of which is designated by 91, and serves to maintain the lever in its upright position, (shown in Fig. 2,) whereby the lug 92 of said lever can be engaged by the actuating device or block 93, secured to the upper side of the disk or stop 19. The inner face of the lug or shoulder 92 is straight, while the rear face thereof is beveled or inclined upwardly. As the disk turns in the manner hereinbefore set forth the block 93 thereon will strike the straight face of the lug 92, thereby swinging the lower portion of the lever to the right, as indicated by the arrow in Fig. 2, and hence moving the upper arm of the lever in the opposite direction, so that said upper arm can thrust the bar 81 in the direction of the arrow to effect an operation of the register mechanism. When the parts have reached their extreme positions, the block 93 will have reached a point beyond the lever 89, as shown in Fig. 4, and on the return movement of the parts said block will pass in contact with the beveled face of the lug 92, and will thereby swing said lever ineffectively about its center until the two parts pass out of engagement, at which time the lever will resume its initial position by reason of the centralizing-weight 91.

In Figs. 11 to 14 I have shown a modified form of register mechanism, the register being designated by 75 and the spring-actuated register-operating bar being designated by 95 and being adapted to be engaged by the roller 96 at the upper end of the lever 97, pivoted in the casing, as at 98, and the lower end of said lever being in position to be engaged by the working portion 99 of the spring-operated block 100, mounted for movement in the guideway 101 in the upper face of the disk 19. The actuating-spring is shown as coiled and bears against the rear wall of the guideway 101 and the back end of the slide. The said slide is held against displacement by the plate 102, secured to the periphery of the disk and adapted to limit the forward movement of said slide. In Figs. 11 and 12 the working portion of the slide or pawl is shown as being in engagement with the lower end of the lever 97, whereby when the disk 19 is turned in the direction of the arrow shown in Fig. 12 the lower arm of said lever is moved to the right, as shown by the arrow in Fig. 11, the upper arm of said lever being oppositely operated to force the bar 95 inward for the purpose of securing the operation of the register. On the return stroke of the parts the working portion 99 of the slide will ride along the beveled face 105 at the lower end of the lever, which operation forces said slide inward, so that the two parts can freely pass, and when they are out of contact the relaxing coiled spring 106 serves to return the slide 100 to its first position. (Shown in Figs. 11 and 12.)

Changes in the form, proportion, size, and the minor details of construction within the scope of the appended claims may be resorted to without departing from the spirit or sacrificing any of the advantages of this invention.

Having thus described the invention, what I claim is—

1. In an apparatus of the class specified, a measuring-reservoir in combination with a longitudinally-adjustable cylinder having a closed end projecting into the reservoir, a cap removably applied to the outer end of the cylinder in locked position thereover, a supply-pipe leading to said reservoir, a discharge-pipe leading from said reservoir, valves for controlling the supply and discharge, and mechanism in connection with the stems of the said valves for providing a locking means and including disks attached to the stems, a bolt movably connected to and controlled in its movements by the operation of one of the disks and adapted to be engaged with or disengaged from the opposite disk, and means for guiding the said bolt.

2. In an apparatus of the class specified, a measuring-reservoir in combination with a longitudinally-adjustable cylinder having a closed end exposed in said reservoir and adapted by its adjustment to vary the containing capacity of said reservoir, a cylinder-cap exclusively surrounding said cylinder and having a longitudinal dimension sufficient to permit of the maximum exterior adjustment of the cylinder exclusively surrounded, and serving to prevent access thereto, and means for removably locking the cap in position.

3. In an apparatus of the class specified, a measuring-reservoir having a reduced annularly-flanged end, a ring provided with a flange secured to and projecting rearwardly from said annularly-flanged end, a cylinder longitudinally movable in the ring and extending into the reservoir and serving to vary the containing capacity of said reservoir, and a movable binding device carried by the ring and adapted to engage said cylinder for holding the same in an adjusted position, substantially as described.

4. In an apparatus of the class specified, a measuring-reservoir having a flange, a ring provided with a flange fitting against said first-mentioned flange and interiorly threaded, a cylinder exteriorly threaded and adapted to engage the threads on said ring, the inner end of the cylinder being closed, a set-screw carried by the ring for engaging the cylinder, a cap in threaded engagement with the ring, and means for locking the cap to the reservoir, substantially as described.

5. In an apparatus of the class specified, the combination with a measuring-reservoir; of an exteriorly-threaded cylinder adjustable and having a closed end movable into the reservoir for varying the containing capacity of said reservoir, a removable cap for inclosing the regulating-cylinder and having a dimension to permit of the maximum exterior adjustment of said cylinder, valve-controlled supply and exhaust pipes in communication with the reservoir and connected for operation in alternation, a tank communicating with said measuring-reservoir and having a vent, a valve adapted to close said vent, and a float in said tank connected to and adapted to operate said valves, said float being actuated by the rise and fall of the liquid entering the tank from the measuring-reservoir.

6. In an apparatus of the class specified, the combination with a measuring-reservoir, and valve-controlled supply and exhaust pipes in communication therewith and connected for operation in alternation, of a tank, a pipe connecting the tank and reservoir, a valve adapted to close a vent in the tank, a float in said tank adapted to operate said valve and actuated by the rise and fall of the liquid entering the tank from the measuring-reservoir, and a guard located over the discharge end of said pipe and adapted to receive the direct force of the air and water as the same enter said tank from the measuring-reservoir, substantially as described.

7. In an apparatus of the class set forth, the combination with a casing, of a measuring-reservoir, a tank communicating with the upper part of said reservoir and having a vent, a longitudinally-adjustable cylinder for varying the containing capacity of said reservoir for measuring different quantities, an inclosing cap for said cylinder, valve-controlled supply and exhaust pipes in communication with the reservoir below the point of communication of said tank therewith, and connected for operation in alternation, a float in said tank provided with centering and guiding means, a valve adapted to close the vent of the tank, and a stem connecting the float and valve and extending upwardly through the top of the casing.

8. In an apparatus of the class specified, the combination with a measuring-reservoir and with valved supply and discharge pipes, a tank communicating with said reservoir and having a vent, and also having its bottom depressed and formed with ports communicating with the space formed by the said depression, a valve adapted to close said vent, a float in the tank having an annular bead on its under side adapted to rest on the outer portion of the bottom of the tank and provided upon its side with projections contiguous to the inside of the tank, and a valve for said vent in position to be operated by the float, substantially as described.

9. In an apparatus of the class specified, the combination with a measuring-reservoir and with valved supply and discharge pipes communicating therewith, a tank having a vent and a depressed bottom, the latter formed in its outer portion with ports, a pipe connected with the central depressed portion of the tank and with the reservoir, a guard in the depression of the tank and connected with the floor thereof by offsets and extending over the discharge end of said pipe and serving to prevent the direct application of the rising air and liquid to the float, a valve for said vent, and a float located above the guard and connected with the valve for operating the same, substantially as described.

10. In an apparatus of the class specified, the combination with supply and discharge pipes, and rotatable valves for controlling said pipes, of a shiftable locking device comprising a slidable bolt located horizontally between and connected to an attachment for one of the valves and unconnected to and disposed for loose engagement with an attachment for the other valve, the bolt being actuated in alternation for locking said valves by the movement of one of the latter.

11. In an apparatus of the class specified, the combination of a reservoir, supply and discharge pipes leading to and from different portions of said reservoir, rotatable valves for controlling said pipes oppositely disposed in planes at right angles to the latter and independently operable, a concealed longitudinally-slidable locking-bolt intermediate of the valves and actuated by one of the latter to lock the other, a link movably connected at opposite extremities respectively to a disk on one valve-stem and the bolt, and disks on the valve-stems disposed in horizontal planes, one having a recess in the periphery to loosely and removably receive the end of the bolt, the other disk having the link connected thereto.

12. In an apparatus of the class specified, the combination with a measuring-reservoir, independent discharge and supply pipes communicating with said reservoir, and independently-operable rotatable valves for controlling said supply and discharge pipes, of means for limiting the rotatable movement of the valves and properly positioning them, a concealed longitudinally-slidable locking device between the valves, a link pivotally connected at opposite extremities respectively to a device on one of the valve-stems and to the bolt, the one extremity of the bolt loosely and removably engaging a device on the valve-stem opposite that to which the link is indirectly connected, and exteriorly-located means for operating valves.

13. In an apparatus of the character set forth, the combination with supply and discharge controlling means including two rotatable valves provided with parallel vertical stems, of disks horizontally disposed on said stems, and movable therewith, one of the disks having a notch in its periphery and both slotted segmentally to engage limiting-stops, a guide-bracket interposed between the disks, a bolt slidably mounted in said bracket, and a link pivotally connected at its opposite extremities respectively to the bolt and one of the disks and operated by the latter disk to removably engage the notch in the opposite disk.

14. In an apparatus of the class specified, the combination with a measuring-reservoir, of supply and discharge pipes communicating with said reservoir, supply and discharge valves located in the pipes and having stems, two disks each having cut-out portions thereby producing shoulders on the disks, and one of said disks having a notch, a slide coöperating with the disk that is connected with the discharge-valve, a link joined to the slide and also connected with the supply-valve, and stops disposed in the path of said shoulders, substantially as described.

15. In an apparatus of the class specified, the combination with a measuring-reservoir, of supply and discharge pipes communicating therewith, supply and discharge valves operative in the respective pipes, a stop connected with the discharge-valve, a sliding stop coöperating with said first-mentioned stop, a slotted guide for guiding the slide in a straight path, a link connected with the supply-valve, and a pivot joining said link to the slide, the pivot extending through the slot in said plate, substantially as described.

16. In an apparatus of the class specified, the combination with a measuring-reservoir, of supply and discharge pipes communicating therewith, supply and discharge valves, a bar, a lever adapted to engage said bar, a spring-actuated block connected with one of the valves for operating said lever, and a register in position to be operated by said bar, substantially as described.

17. In an apparatus of the class specified, the combination with a measuring-reservoir, of supply and discharge pipes communicating with said reservoir, supply and discharge valves located in the pipes, a register having a spring-operated bar, a pendent lever adapted to engage said spring-operated bar and having a beveled portion, and a spring-actuated device connected with one of the valves and provided with a beveled portion to ride over the beveled portion of the lever in one direction and adapted to engage therewith on moving the lever in the opposite direction, substantially as described.

18. In an apparatus of the class set forth, the combination with a casing provided with a shelf or partition dividing the casing into two compartments, supply and discharge pipes extending through the casing, a reservoir secured to the casing and communicating with said pipes, valves in the latter having stems provided with operating devices, means controlled by the change of level of the liquid in the upper compartment for exhausting the air and preventing the escape of the liquid, and interlocking stop devices connected with the valve-stems and supported by said shelf or partition for preventing the opening of both valves simultaneously, substantially as set forth.

19. In an apparatus of the class described, the combination with a casing, of a reservoir fitted to the casing, a longitudinally-adjustable cylinder for regulating the contents of the reservoir, a cap detachably fitted to the reservoir over the said cylinder, a lock for connecting the cap with the reservoir, supply and discharge pipes communicating with the reservoir and provided with valves, the stems of which carry operating devices, and interlocking stop devices connected with the valves, substantially as described.

20. In an apparatus of the class specified, the combination with a casing having openings, of a circular washer fitted against the rear side of the casing and having openings registering with the openings in the casing, a reservoir fitted to the casing and surrounding said openings, a cap detachably connected with the reservoir, a lock for securing the cap in place, a device operable with the reservoir for regulating its cubical contents and inclosed within the said cap and protected thereby, supply and discharge pipes communicating with the reservoir and having valves the stems of which are provided with operating devices, and interlocking stop devices suspended in the casing and connected with the valve-stem, substantially as described.

21. In an apparatus of the class specified, a measuring-reservoir in combination with a longitudinally-adjustable cylinder for varying the containing capacity of said reservoir to measure different quantities, an inclosing cap for said cylinder removably applied in locked position thereover, a supply-pipe leading to the upper portion of the reservoir, a discharge-pipe leading from the lower part of said reservoir, valves in the said supply and discharge pipes having upwardly-projecting parallel stems which are rotatable, and mechanism in connection with the stem of one of the valves for providing a locking means on the other stem and controlled by the movement of the valve-stem to which it is attached for disposition in a locked and in an unlocked condition.

22. In an apparatus of the class specified, the combination with a supply device, independent supply and discharge pipes for said supply device and having rotatable valves for controlling the supply and discharge to and from the reservoir, the said valves being provided with vertically-disposed parallel stems which are rotatable, a guide located between the valve-stems, and a longitudinally-shiftable rigid locking-bolt mounted in the said guide and connected to a device on one valve-stem and removably engageable with a device on the other valve-stem.

23. In a measuring device of the character set forth, the combination with a measuring-reservoir of means for varying its cubical capacity, horizontally-disposed supply and discharge pipes communicating with said reservoir, and rotatable valves in the supply and discharge pipes having upwardly-extending parallel stems, of disks horizontally disposed on and rotatable with the valve-stems, the disk on the discharge-valve stem having an upward projection and a recess in the periphery, means for limiting the rotary movement of the disks and stems, a guide-bracket interposed between the said disks, a longitudinally-slidable rigid locking-bolt mounted in the said guide and connected to the disk on the stem of the supply-valve and adapted to engage the recess on the disk in the stem of the discharge-valve, and a registering mechanism having an extending member in the path of movement of the projection on the disk carried by the discharge-valve stem.

In testimony that I claim the foregoing as my own I have hereto affixed my signature in the presence of two witnesses.

GEORGE WILFRID JOHNSON.

Witnesses:
JOHN S. EADS,
C. H. NEY AGRAMONT.